US011036761B1

(12) United States Patent
Bailey et al.

(10) Patent No.: US 11,036,761 B1
(45) Date of Patent: Jun. 15, 2021

(54) CONFIGURABLE DATABASE MANAGEMENT

(71) Applicant: Wells Fargo Bank, N.A., San Francisco, CA (US)

(72) Inventors: Jay Bailey, Charlotte, NC (US); Kevin Liberacki, Huntersville, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 320 days.

(21) Appl. No.: 16/266,916

(22) Filed: Feb. 4, 2019

Related U.S. Application Data

(63) Continuation of application No. 14/866,258, filed on Sep. 25, 2015, now Pat. No. 10,198,495.

(51) Int. Cl.
*G06F 16/00* (2019.01)
*G06F 16/27* (2019.01)
*G06F 16/23* (2019.01)
*G06F 16/22* (2019.01)

(52) U.S. Cl.
CPC ........ *G06F 16/278* (2019.01); *G06F 16/2282* (2019.01); *G06F 16/2365* (2019.01)

(58) Field of Classification Search
CPC ........................... G06F 16/278; G06F 16/2282
See application file for complete search history.

(56) References Cited

U.S. PATENT DOCUMENTS

| 7,542,975 | B2 | 6/2009 | Rjaibi | |
|---|---|---|---|---|
| 7,783,113 | B2 | 8/2010 | Oh et al. | |
| 10,108,690 | B1* | 10/2018 | Murray | G06F 16/278 |
| 2004/0199517 | A1* | 10/2004 | Casati | G06F 16/283 |
| 2005/0187897 | A1* | 8/2005 | Pawar | G06F 16/2282 |
| 2006/0085378 | A1 | 4/2006 | Raizman et al. | |
| 2006/0218123 | A1* | 9/2006 | Chowdhuri | G06F 16/24532 |
| 2008/0228829 | A1* | 9/2008 | Crutchfield | G06F 16/248 |
| 2009/0182779 | A1* | 7/2009 | Johnson | G06F 16/24568 |
| 2012/0209817 | A1* | 8/2012 | Golab | G06F 16/254 707/688 |
| 2012/0215779 | A1* | 8/2012 | Lipstone | H04L 67/10 707/737 |
| 2013/0151491 | A1* | 6/2013 | Gislason | G06F 16/2282 707/696 |
| 2013/0166606 | A1* | 6/2013 | Fricke | G06F 16/2282 707/803 |
| 2014/0201355 | A1* | 7/2014 | Bishnoi | H04L 41/0622 709/224 |

(Continued)

OTHER PUBLICATIONS

The International Conference on Database, Data Warehouse, Data Mining and Big Data, The Society of Digital Information and Wireless Communications; Sep. 10-12, 2015; pp. 1-44.*

(Continued)

*Primary Examiner* — Leslie Wong
(74) *Attorney, Agent, or Firm* — Shumaker & Sieffert, P.A.

(57) ABSTRACT

In one example, a device for partitioning a database includes an interface to a database containing one or more tables, and a hardware-based processor configured to determine configuration information for the database, the configuration information defining a partitioning scheme for the one or more tables of the database, form a partition function based on the configuration information and a schema for the database, and apply the partition function to the one or more tables to partition the one or more tables.

20 Claims, 6 Drawing Sheets

(56) References Cited

U.S. PATENT DOCUMENTS

2015/0106407 A1* 4/2015 Adayilamuriyil ..... G06F 16/284
707/804
2016/0267105 A1* 9/2016 Sun ...................... G06F 16/128

OTHER PUBLICATIONS

Prosecution History from U.S. Appl. No. 14/866,258, dated Nov. 16, 2017 through Sep. 27, 2018, 78 pp.

* cited by examiner

CONFIGURABLE DATABASE MANAGEMENT

This application is a continuation of U.S. application Ser. No. 14/866,258, filed Sep. 25, 2015, the entire content of which is incorporated herein by reference.

TECHNICAL FIELD

This disclosure relates to databases.

BACKGROUND

Databases are used in computing systems to store various types of data. In general, databases provide tables, in which data can be organized for ease of data entry, storage, and retrieval. In some cases, the tables may become large, in which case the tables can be partitioned for further ease of access to the data.

SUMMARY

In general, this disclosure describes techniques for managing a database. For example, one aspect of managing a database involves partitioning the database, which may improve data access speeds. Partitioning the database may also simplify other management tasks, such as deleting unneeded data and archiving important data for long term storage. Such archiving tasks may also be performed as part of management of a database. Furthermore, management of the database may include error checking and correction, e.g., during partitioning and/or archiving activities.

In one example, a method of partitioning a database includes determining, by a hardware-based processor, configuration information for the database, the configuration information defining a partitioning scheme for one or more tables of the database, forming, by the hardware-based processor, a partition function based on the configuration information and a schema for the database, and applying, by the hardware-based processor, the partition function to the one or more tables to partition the one or more tables.

In another example, a device includes an interface to a database comprising one or more tables, and a hardware-based processor configured to determine configuration information for the database, the configuration information defining a partitioning scheme for the one or more tables of the database, form a partition function based on the configuration information and a schema for the database, and apply the partition function to the one or more tables to partition the one or more tables.

In another example, a non-transitory computer-readable storage medium has stored thereon instructions that, when executed, cause a processor to determine configuration information for the database, the configuration information defining a partitioning scheme for one or more tables of the database, form a partition function based on the configuration information and a schema for the database, and apply the partition function to the one or more tables to partition the one or more tables.

The details of one or more examples are set forth in the accompanying drawings and the description below. Other features, objects, and advantages will be apparent from the description and drawings, and from the claims.

DETAILED DESCRIPTION

Figure 1:
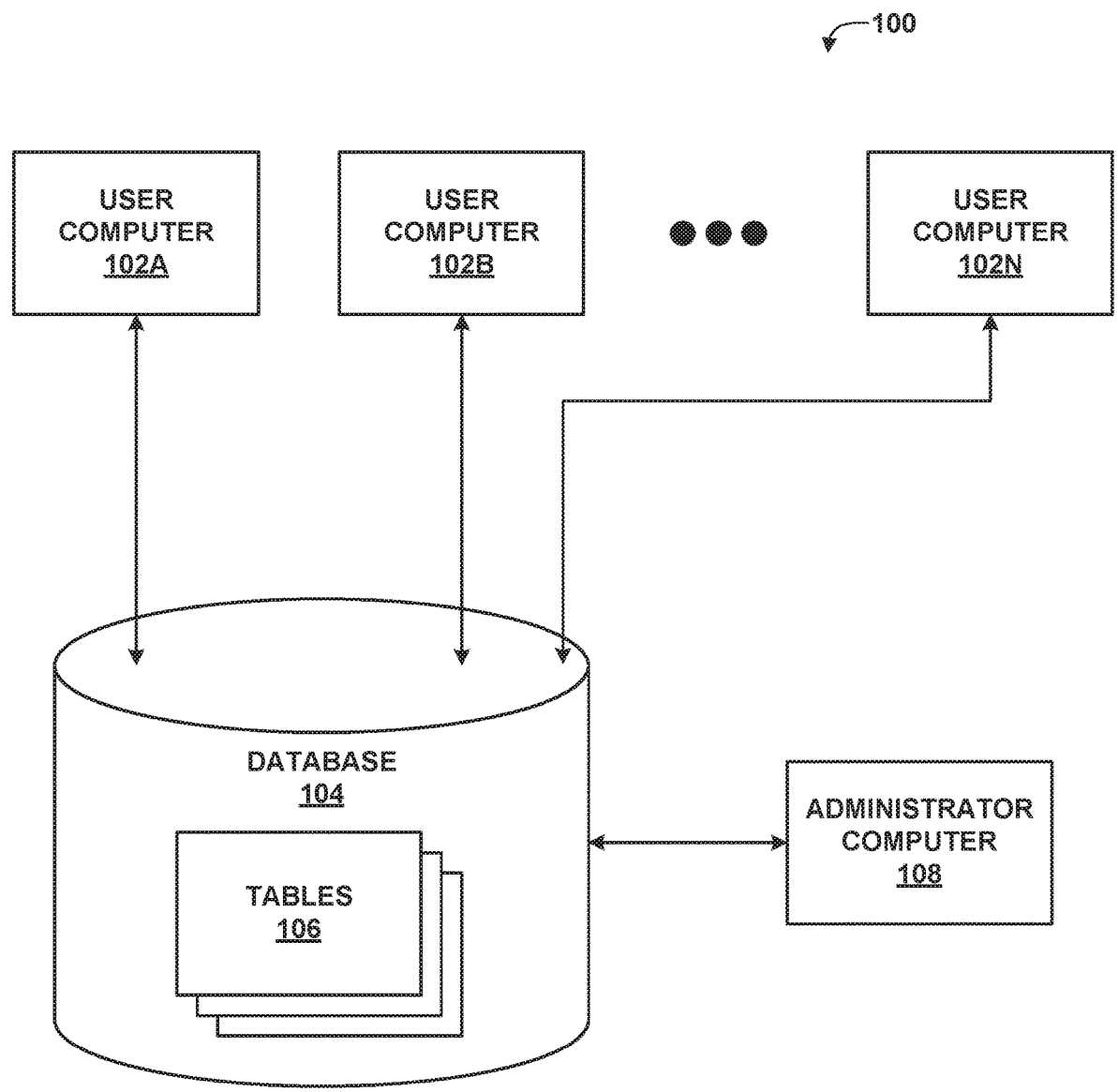
FIG. 1 is a block diagram illustrating an example system for partitioning an example database.

FIG. 1 is a block diagram illustrating an example system 100 for partitioning an example database 104. In this example, system 100 includes user computers 102A-102N (user computers 102), database 104, and administrator computer 108. Database 104 includes a plurality of tables 106. Database 104 may represent a relational database. Tables 106 may include entries conforming to a row-column format. The entries of tables 106 may represent transactions or various sets of data.

In general, users interact with database 104 via respective user computers 102. For example, users may add data to database 104 or retrieve data from database 104. When adding data to database 104, a user may enter a transaction into one of user computers 102, e.g., user computer 102A, and user computer 102A may translate data of the transaction into a format that can be entered into database 104. For example, if system 100 represents a data storage system for a bank, a user (e.g., a bank teller) may enter a deposit or withdrawal transaction, which may include data such as a date, a customer's name, an account number, and a deposit or withdrawal amount.

Likewise, users may retrieve data from database 104. To retrieve data, a user may submit queries to database 104 via one of user computers 102. Such queries may be formulated according to a database querying language, such as Structured Query Language (SQL). A user may query database 104 to extract data for planning purposes, to set or revise periodic business targets, to analyze business performance, or make other various business decisions.

One or more of tables 106 of database 104 may include data along a particular dimension that may be partitioned, in accordance with the techniques of this disclosure. For example, the dimension may be time. Thus, a table may be partitioned in the time dimension. A table may be partitioned into daily partitions, weekly partitions, monthly partitions, yearly partitions, or the like. In one example, a table may be partitioned into daily partitions, such that each partition includes one day of data. A table partitioned into weekly partitions may include partitions having one week of data. Likewise, a table partitioned into monthly partitions may include partitions having one month of data. Other dimensions along which a table may be partitioned include, for example, geographic location, transaction type, account numbers, or the like.

Administrator computer 108 provides an administrator access to database 104. For example, administrator computer 108 may include an interface to database 104, such as a network interface, a physical interface (e.g., a universal serial bus (USB)), or the like. Alternatively, database 104 may be included within administrator computer 108, and the interface to database 104 may correspond to a memory bus or other internal interface.

User computers 102 and administrator computer 108 may be communicatively coupled to database 104 in a variety of ways. In some examples, user computers 102 and/or administrator computer 108 may be directly coupled to database 104, e.g., via a Universal Serial Bus (USB) or local area network (LAN) connection. In some examples, user computers 102 and/or administrator computer 108 may be coupled to database 104 remotely, e.g., via an external network, such as the Internet. In some cases, database 104 (or a management device that includes or is communicatively coupled to database 104) may authenticate users of user computers 102 and/or administrator computer 108 prior to granting access to data of database 104.

An administrator may use administrator computer 108 to perform various tasks. For example, an administrator may initially configure database 104 via administrator computer 108. Likewise, in accordance with the techniques of this disclosure, an administrator may submit instructions to database 104 via administrator computer 108 to partition one or more of tables 106. Furthermore, in accordance with these techniques, the administrator may prevent certain sets of data from being deleted from database 104. Moreover, also in accordance with these techniques, an administrator may determine whether a particular administrative action, such as partitioning, can be performed and/or has been performed successfully via administrator computer 108. Some or all of the functionality attributed to administrator computer 108 may additionally or alternatively be performed by database 104.

This disclosure describes various techniques related to management of a database, such as database 104, which may be used alone or in any combination. In one example, partitioning and administration of partitioning of a database is configurable. In another example, configurable archiving strategies may be employed. In yet another example, error checking and error correction techniques may be used. For purposes of example and explanation, these techniques are described with respect to administrator computer 108. Again, administrator computer 108 may perform any or all of these techniques, alone or in any combination.

As noted above, administrator computer 108 may allow an administrator to configure partitioning of tables 106 included in database 104. As noted above, partitioning of tables 106 may be along a particular dimension, such as time. An administrator may use administrator computer 108 to configure partitioning such that partitions of tables 106 have particular sizes. For example, assuming the partitioning dimension is time, partitions of tables 106 may correspond to days, weeks, months, quarters, years, or the like. In addition, the administrator may prevent certain time periods from having corresponding partitions. For example, assuming that tables 106 are partitioned such that each partition corresponds to a day, partitions may be omitted that would otherwise correspond to weekends and holidays.

The administrator may further configure a number of partitions to be maintained, and configure database 104 to discard data for any additional partitions. In this manner, partitions of tables 106 may represent a sliding window. For example, assuming that the number of partitions is ten (10), administrator computer 108 may partition tables 106 into ten partitions, each corresponding to one of the most recent ten business days. Data for any days older than the most recent ten days may be discarded (assuming such data is not archived). Furthermore, when a new day transpires, administrator computer 108 may form a new partition for the new day and discard the data of the partition corresponding to the oldest day.

In particular, administrator computer 108 may be configured to formulate a partition function according to configuration information received from an administrator. Moreover, administrator computer 108 may execute the partition function both to initially partition tables 106 of database 104 and periodically (e.g., daily) to maintain partitioning according to the configuration information.

In a Structured Query Language (SQL) Server, for example, partitioning is configured via partition functions and partition schemes. An SQL Server system may be installed in database 104 or on a device including database 104. Partition functions logically slice a table, such as one of tables 106, into its various desired partition ranges. Partition schemes, which when created refer to an already existing partition function, map those partitions to pre-created filegroups on disk. The PRIMARY filegroup is always first in a partition scheme. Rows in a partitioned table that fall before the first partition range will be located in the PRIMARY filegroup. The use of "RANGE RIGHT" dictates that the partition range values are "to the right" of the partition slicing and therefore are included in each partition that they define, as opposed to the one before it (RANGE LEFT). Rows at or above the first partition range value will be stored on disk in the filegroup dictated by the table's partition function. While each range value in a partition function must be unique, filegroups can be repeatedly used in a partition scheme.

Administrator computer 108 may create a separate table (not shown in FIG. 1) within database 104 to store configuration information. An example of such a table is described in greater detail below with respect to FIG. 2. In general, the table may store information such as, for example, tables for which partition maintenance is to be performed, a dimension along which the tables are to be partitioned (e.g., time), granularity of the partitions (e.g., daily, weekly, monthly, quarterly, yearly, etc.), a number of partitions to be maintained, and archiving information. Thus, administrator computer 108 may query the configuration information table to determine how to partition one or more of tables 106. Again, partitioning using this configuration information may be performed in the same manner both initially and periodically after the original partition is performed.

Administrator computer 108 may also be configured to archive data of database 104, e.g., of tables 106. Archiving may be applied to partitioned tables or to unpartitioned tables. For partitioned tables, one or more partitions may be classified in a manner to prevent deletion. For example, one or more of the partitions may exceed a threshold for maintained data, and yet not be deleted. When performing a new partition, for example, administrator computer 108 may iterate through each current partition and determine whether the partition is currently archived. If the partition is archived, administrator computer 108 may prevent or skip deletion of the archived partition. On the other hand, if the partition is not archived, administrator computer 108 may determine whether the partition is older than a threshold date, and if so, delete the partition.

In general, partitioning makes deletion of certain sets of data simple, in that a single command can be issued to delete an unwanted partition. Nevertheless, in some instances, certain tables might not benefit from partitioning. Administrator computer 108 may be configured to archive certain data of an unpartitioned table as well. In particular, administrator computer 108 may mark individual rows of an unpartitioned table as archived, or may mark one or more ranges of rows as archived. Thus, when deleting data from an unpartitioned table, administrator computer 108 may determine whether any of the rows are marked for archive, and if so, prevent deletion of such rows. Otherwise, administrator computer 108 may delete data from an unpartitioned table by deleting individual rows from the unpartitioned table (again, assuming that the rows are not marked as archived).

Furthermore, administrator computer 108 may be configured to perform error checking prior to and/or after partitioning one of tables 106. Administrator computer 108 may also be configured to perform such error checking prior to and/or after archiving or deleting data from one of tables 106. In general, administrator computer 108 may examine the state of such a table before performing partition maintenance. If the state of the table is such that the table cannot be partitioned, administrator computer 108 may prevent partitioning of the table. For example, administrator computer 108 may copy all data of the table to a temporary table, or a "hold table." Administrator computer 108 may then partition the table. If all data from the hold table is present in the partitions for the table, administrator computer 108 may determine that the partitioning was successful. However, if any data is missing from the partitioned table, administrator computer 108 may restore the original, unpartitioned table from the hold table and return an indication that partitioning cannot be successfully performed.

In general, administrator computer 108 may apply the same partition function to multiple tables. In this case, however, each table to which a partition function is applied must have the same archiving behaviors. Thus, as part of error checking, administrator computer 108 may determine whether any of the tables to which a given partition function is to be applied has a different archiving behavior. If so, administrator computer 108 may determine that the given partition function cannot be applied to that table.

Functionality of user computers 102, administrator computer 108, and database 104 may be implemented in any of a variety of devices. In general, the functionality may be implemented in a computing device including one or more processing units, such as one or more microprocessors. The functionality may be implemented in hardware or in a combination of software and hardware, where requisite hardware may be provided to store and execute software instructions. Such hardware may include, for example, a processing unit and a computer-readable storage medium. Other hardware may include digital signal processors (DSPs), application specific integrated circuits (ASICs), field programmable gate arrays (FPGAs), or any other equivalent integrated or discrete logic circuitry, as well as any combinations of such components.

As noted above, the techniques of this disclosure allow a partition function to be formed from configuration information for a database. This allows for automation of partitioning of tables of the database, such that the tables can be partitioned multiple times in substantially similar manners. That is, rather than a user manually creating and applying a partition function, a computing device, such as administrator computer 108 (or another computing device associated with database 104) may automatically create and apply a partition function to one or more of tables 106. This may allow a user, such as an administrator, to configure database 104 to maintain a partitioning scheme over time, such that the administrator need not manually configure database 104. Likewise, archiving behavior can be automated using the configuration information.

Figure 2:
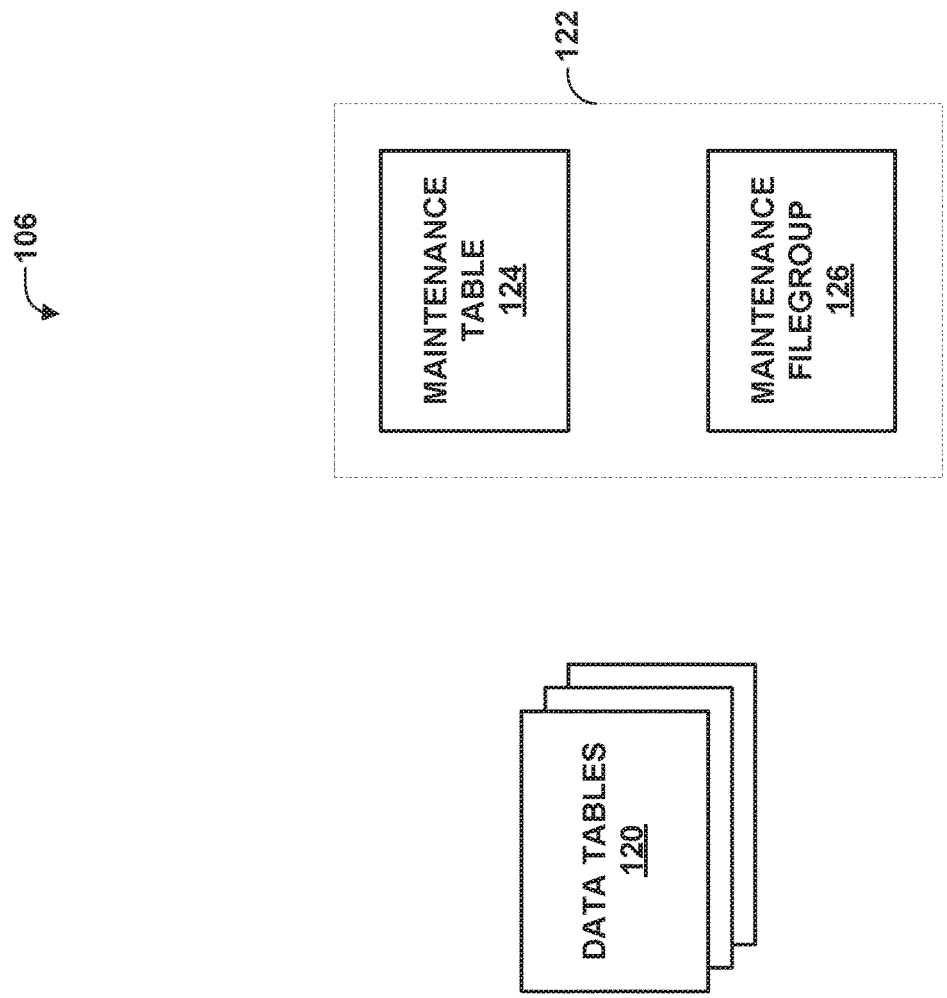
FIG. 2 is a block diagram illustrating example tables that may be included in tables of the example database of FIG. 1.

FIG. 2 is a block diagram illustrating example tables that may be included in tables 106 of FIG. 1. In this example, tables 106 include data tables 120 and configuration tables 122. Configuration tables 122 include maintenance table 124 and maintenance filegroup 126. In general, maintenance table 124 includes data that describes a partitioning structure of data tables 120. Maintenance filegroup 126 includes data that describes database administrator (DBA)-created filegroups available for use in partitioning.

An example schema for maintenance table 124 is shown below:

```
CREATE TABLE [dbo].[MaintenanceTable](
[SCHEMA] [varchar](255) NOT NULL,
[NAME] [varchar](255) NOT NULL,
[PARTITIONED] [bit] NOT NULL,
[WINDOW_LENGTH] [varchar](255) NOT NULL,
[WINDOW_UNITS] [varchar](255) NOT NULL,
[PARTITIONS_AHEAD] [int] NULL,
[WINDOW_GRANULARITY] [varchar](255) NULL,
[ARCHIVING_STRATEGY] [varchar](255) NULL,
[ARCHIVES_KEPT] [int] NULL,
[DATE_COLUMN_NAME] [varchar](255) NOT NULL,
[DATE_COLUMN_TYPE] [varchar](50) NOT NULL,
[MANAGEMENT_ACTIVE] [bit] NOT NULL,
[PARTITION_IF_NOT] [bit] NOT NULL,
[PERFORM_MARS_PURGE] [bit] NOT NULL,
[FORCE_PARTITION_SCHEME]      [varchar](255)
   NULL,
[FORCE_PARTITION_FUNCTION]    [varchar](255)
   NULL)
) ON [PRIMARY]
```

Maintenance table 124 may be organized according to the example schema shown above. Each row of maintenance table 124 may generally correspond to one of data tables 120. Maintenance table 124 may include the following columns, which include data that may be used to drive the logic of partitioning and partition maintenance for a corresponding table (e.g., one of data tables 120) represented in one of the rows of maintenance table 124. A window_units column may include data indicative of the unit of time that, when multiplied by WINDOW_LENGTH, defines the calendar length of the partition window. Example values for values of the window_units column include DAY, BUSINESS_DAY, WEEK, MONTH, QUARTER, and YEAR. A window_granularity column may include data indicative of the size in time of partitions within the partition window. Example values for the window_granularity column include DAY, BUSINESS_DAY, WEEK, and MONTH. An archiving_strategy column includes data, if applicable, indicative of the size of archive partitions kept after the partition window. Example values for the archiving_strategy column include WEEKLY, MONTHLY, and QUARTERLY.

Another column that may be included in maintenance table 124 is a schema column, which represents a schema to which the corresponding table corresponds. Typically, the schema column includes a value of "dbo." Maintenance table 124 may also include a name column, including a value representing the name of a corresponding table (e.g., one of data tables 120) represented in one of the rows of maintenance table 124. Maintenance table 124 may also include a partitioned column, representing whether the corresponding table is partitioned, e.g., a value of "1" for partitioned, "0" for unpartitioned. Maintenance table 124 may also include a window_length column, the value of which may indicate the number of partitions included in a sliding window of partitions for the corresponding table. Maintenance table 124 may also include a partitions_ahead column, including a value indicative of a number of partitions to be created in the corresponding table whenever any new partition is needed.

Maintenance table 124 may also include an archives_kept column, including a value representing whether data of the corresponding table is archived, e.g., a value of "null" for not archived or a positive integer representing a number of archives kept for the corresponding table. Maintenance table 124 may also include a date_column_name column, the value of which may represent the name of the partitioning column, that is, the column of data along which the corresponding table is partitioned. Maintenance table 124 may also include a date_column_type column, having a value representing the type for the partitioning column. Maintenance table 124 may also include a management_active column, having a value representing whether the corresponding table is managed for, e.g., partitioning or archiving. Maintenance table 124 may also include a partition_if_not column, having a value representing whether the corresponding table needs to be partitioned but has not yet been partitioned.

Maintenance filegroup 126 may configure which filegroups are used in partitioning a table of data tables 120. If the number of configured filegroups is less than is needed, filegroups may be re-used. Filegroups may be created via an "ALTER DATABASE" command, which is typically run by DBAs. The size of filegroups should anticipate volumes of usage in the tables being partitioned. Note that, for tables that are maintained with archiving, all filegroups pertaining to such tables should be of the size needed by an archived partition.

Figure 3:
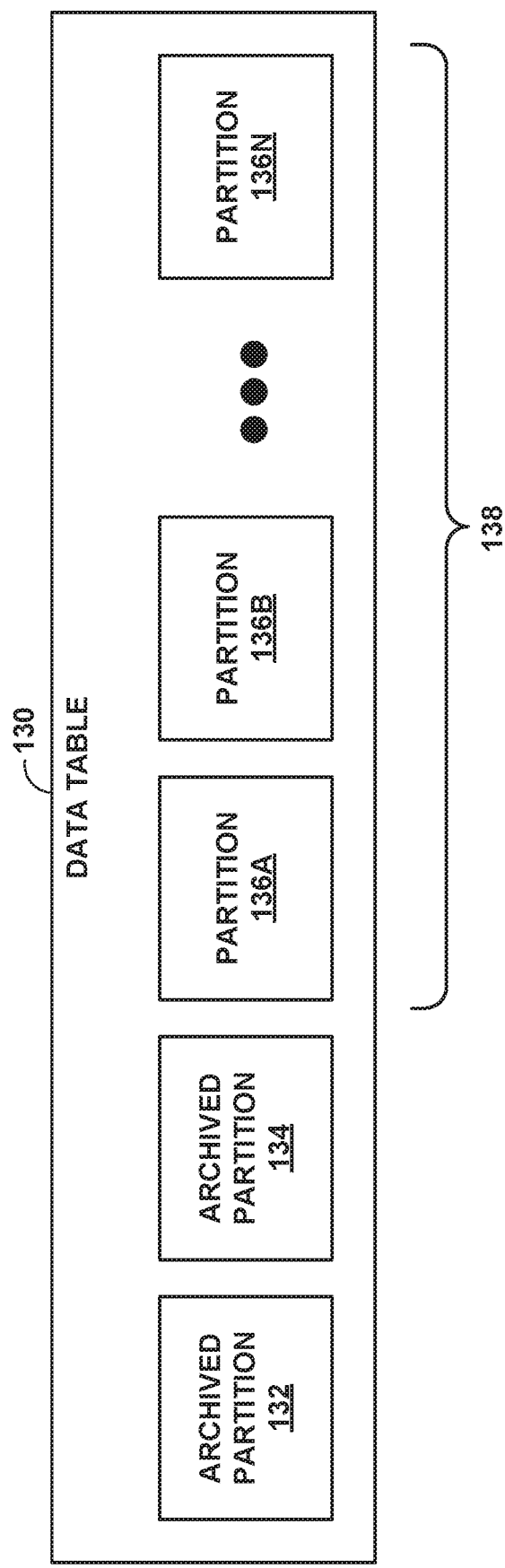
FIG. 3 is a block diagram illustrating an example data table.

FIG. 3 is a block diagram illustrating an example data table 130. Data table 130 may correspond to one of data tables 120 (FIG. 2). In this example, data table 130 is partitioned according to a partition function, and includes archived partitions. In particular, data table 130 includes archived partitions 132, 134, and partitions 136A-136N (partitions 136). Partitions 136 generally correspond to partitions included in sliding window 138. The size of sliding window 138 may be defined by configuration information, e.g., a value in a window_length column of a row of maintenance table 124 corresponding to data table 130.

Assuming, for example, that the configuration information indicated that the sliding window 138 was to have ten partitions, when the number of partitions 136 exceeded ten, oldest ones of partitions 136 would be deleted until only ten partitions 136 remained. Of course, administrator computer 108 may first determine whether any of partitions 136 was subject to archiving, in which case the partition would be treated as an archived partition, rather than being deleted, and not counted in the number of partitions allowed within sliding window 138. Archived partitions, such as archived partitions 132, 134, are not deleted from data table 130.

As an example, data table 130 may be partitioned along a time dimension to include daily partitions for the last ten days. Special days, such as year ends, may be archived. Thus, archived partitions 132, 134 may be omitted from the count of partitions included in sliding window 138, yet nevertheless maintained for data table 130 (i.e., not deleted from data table 130).

Figure 4:
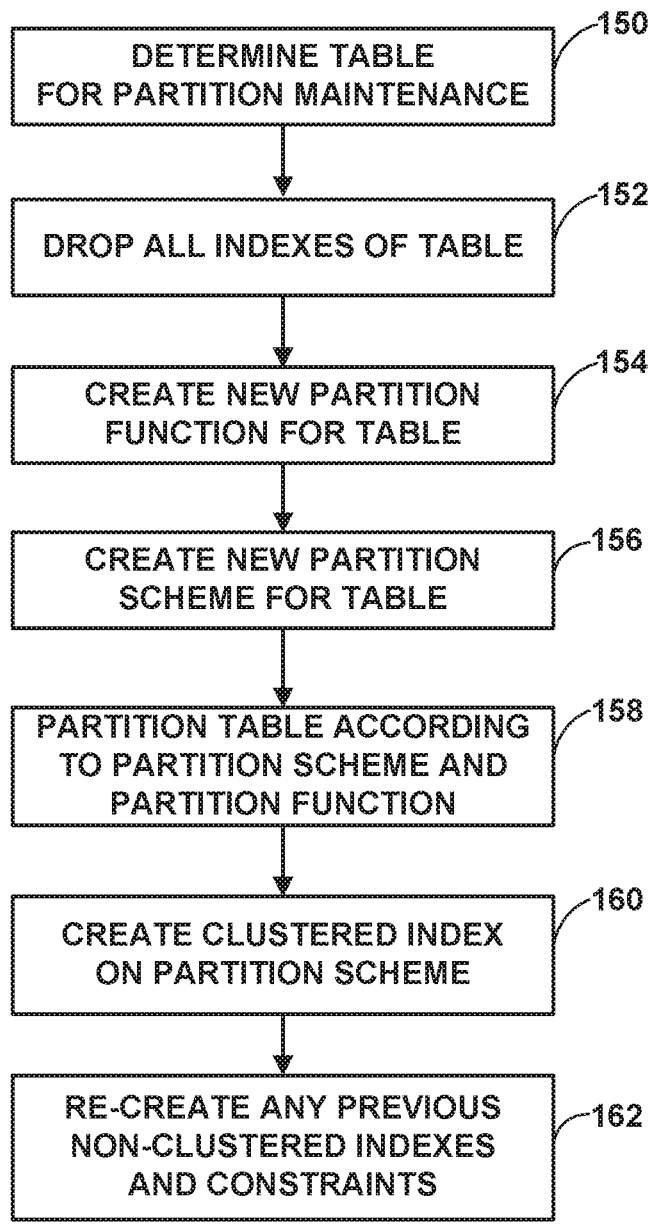
FIG. 4 is a flowchart illustrating an example method for partitioning a table of a database according to the techniques of this disclosure.

FIG. 4 is a flowchart illustrating an example method for partitioning a table according to the techniques of this disclosure. The method of FIG. 4 may be performed by, e.g., administrator computer 108 or database 104. For purposes of explanation, the method of FIG. 4 is explained as being performed by administrator computer 108.

Initially, administrator computer 108 may determine one or more tables for which partition maintenance is to be performed (150). For example, administrator computer 108 may receive a command from a user (such as an administrator) indicating one or more tables for which partition maintenance is to be performed, which may include an initial partitioning of the one or more tables and/or ongoing maintenance to ensure the one or more tables remain correctly partitioned. Administrator computer 108 may store data representing the tables for which partition maintenance is to be performed in configuration information, e.g., as discussed above with respect to FIG. 2. In this manner, administrator computer 108 may determine (e.g., receive or create) configuration information for a database that defines a partitioning scheme for one or more tables of the database. Administrator computer 108 may then issue a command to database 104 to drop all indexes of the one or more tables (152). Indexes for the tables correspond to copies of one or more columns of the tables.

Administrator computer 108 may then create a new partition function for the one or more tables (154). The same partition function may be applied to multiple tables. A database schema may represent tables 106 of database 104, and the configuration information may identify which of tables 106 are to be partitioned using the partition function. In this manner, administrator computer 108 may form a partition function based on the configuration information and a schema for the database. In some examples, administrator computer 108 may first determine whether each of the tables to which the partition function is to be applied have the same archiving behavior, and if not, signal an error to the user and/or prevent application of the partition function to those table(s) that have differing archiving behaviors.

Administrator computer 108 may then create new partition schemes for the one or more tables (156). A partition scheme generally maps partitions of a table to filegroups on a computer-readable storage medium, such as a hard disk. Administrator computer 108 may therefore create individual partition schemes for each of the one or more tables to be partitioned using the partition function. Administrator computer 108 may then partition the table according to the partition scheme and the partition function (158). In this manner, administrator computer 108 may apply the partition function to the one or more tables to partition the one or more tables.

Administrator computer 108 may then create a clustered index on the created partition scheme (160) for each of the tables to be partitioned. In general, a table of a database has exactly one clustered index, which typically corresponds to a primary key of the table. Administrator computer 108 may also re-create any non-clustered indexes and/or constraints (162) that previously existed for the table, such as the indexes that were dropped during step 152 above.

In this manner, the method of FIG. 4 represents an example of a method of partitioning a database, including determining, by a hardware-based processor, configuration information for the database, the configuration information defining a partitioning scheme for one or more tables of the database, forming, by the hardware-based processor, a partition function based on the configuration information and a schema for the database, and applying, by the hardware-based processor, the partition function to the one or more tables to partition the one or more tables.

After a table of a database has been partitioned according to, e.g., the method of FIG. 4, maintenance may be performed on the table to ensure that the table remains partitioned according to the configuration information for the table. For example, each day, administrator computer 108 may determine whether one or more additional partitions need to be created for tables 106 of database 104. For a table needing a new partition, administrator computer 108 may create a new partition (or in some cases, multiple new partitions, if multiple new partitions are created in advance). Administrator computer 108 may further determine whether any of the partitions for the tables need to be archived or deleted, and then archive or delete the tables accordingly (e.g., according to defined sizes of partitioned windows for the tables).

Figure 5:
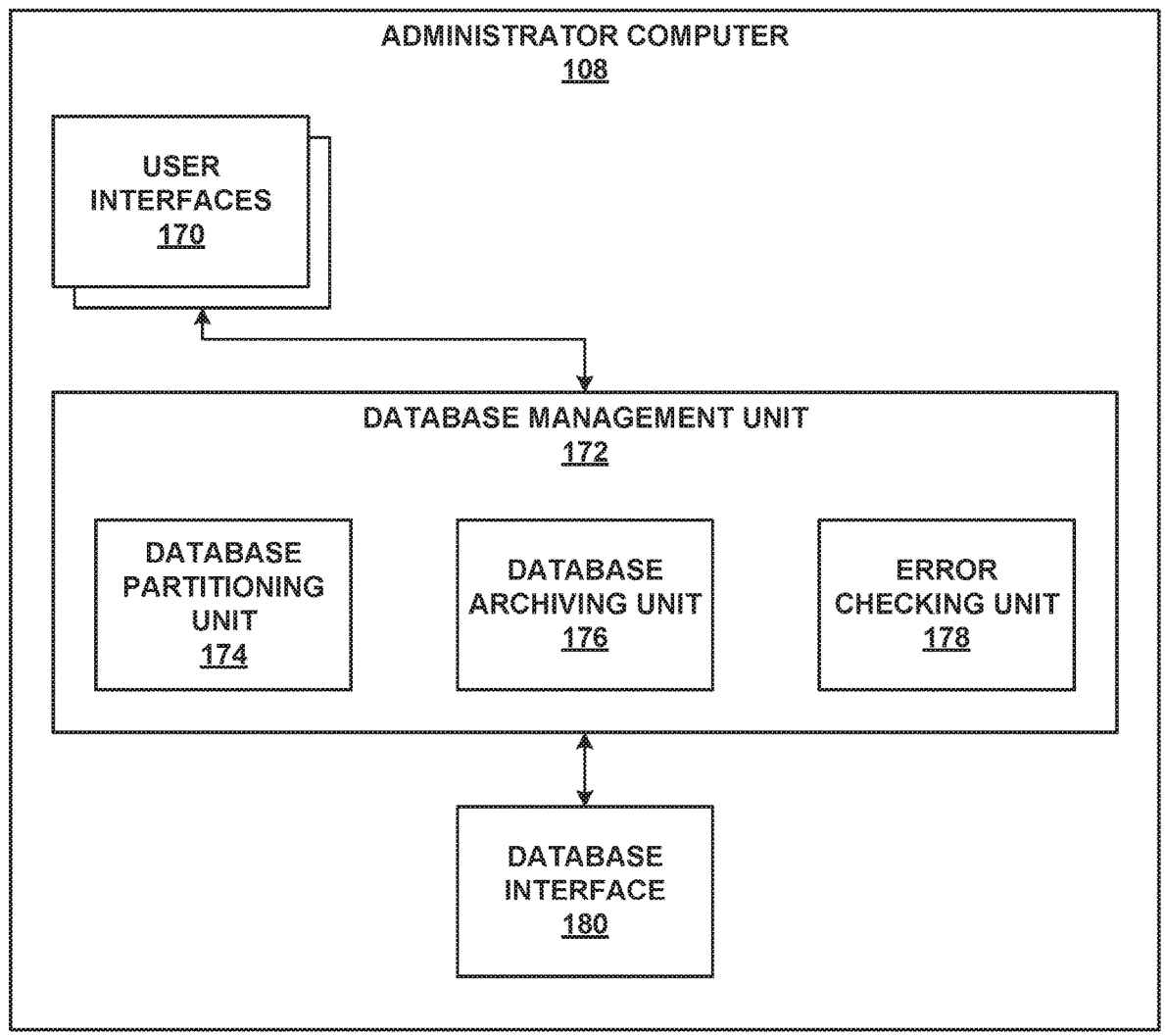
FIG. 5 is a block diagram illustrating an example arrangement of components of the administrator computer of FIG. 1.

FIG. 5 is a block diagram illustrating an example arrangement of components of administrator computer 108 of FIG. 1. In this example, administrator computer 108 includes user interfaces 170, database management unit 172, and database interface 180. User interfaces 170 represent any of a variety of interfaces for receiving input from and providing output to a user, such as a keyboard, mouse, touchpad, touchscreen, display, speakers, camera, microphone, or the like. Administrator computer 108 of FIG. 5 may be configured to perform any or all of the techniques of this disclosure as discussed above, such as the method of FIG. 4.

Database interface 180 provides an interface to database 104 (FIG. 1). That is, database interface 180 allows administrator computer 108 to interact with database 104, e.g., submitting queries to database 104 and receiving data from database 104. In some cases, database interface 180 may directly couple administrator computer 108 to database 104, while in other cases, database interface 180 may provide remote access to database 104. For example, database interface 180 may correspond to a network interface, such as a wired Ethernet interface or a wireless interface configured according to IEEE 802.11.

Database management unit 172, in this example, includes database partitioning unit 174, database archiving unit 176, and error checking unit 178. In general, database partitioning unit 174 is configured to partition tables 106 of database 104 as discussed above. For example, database partitioning unit 174 may determine configuration information for database 104, such as data of maintenance table 124 and maintenance filegroup 126. Again, the configuration information may define a partitioning scheme for one or more of tables 106 of database 104. Database partitioning unit 174 may also form a partition function based on the configuration information and a schema for the database. Database partitioning unit 174 may further apply the partition function to the tables.

Database archiving unit 176 manages archiving data of database 104, e.g., data included in partitioned or unpartitioned tables of database 104. For a partitioned table, database archiving unit 176 may archive the partition by setting values for archiving_strategy and/or archives_kept entries of a row corresponding to the partitioned table in maintenance table 124.

Error checking unit 178 performs error checking before and/or after other management activities, such as partitioning, partition maintenance, and archiving. Error checking unit 178 may prevent finalization of, e.g., partitioning of a table (whether initial partitioning or an update to the partitioning performed during partition maintenance) when such partitioning will not be successful. Instead of partitioning the table (or updating the partitioning) in such an instance, error checking unit 178 may return an error to a user (e.g., an administrator) via user interfaces 170.

Database management unit 172, database partitioning unit 174, database archiving unit 176, and error checking unit 178 may be implemented in hardware or hardware and software, as discussed above. For example, software instructions for any or all of database management unit 172, database partitioning unit 174, database archiving unit 176, and error checking unit 178 may be stored in a computer-readable storage medium (not shown), and a hardware-based processor (not shown) may execute the instructions to perform the functionality attributed to these units.

Figure 6:
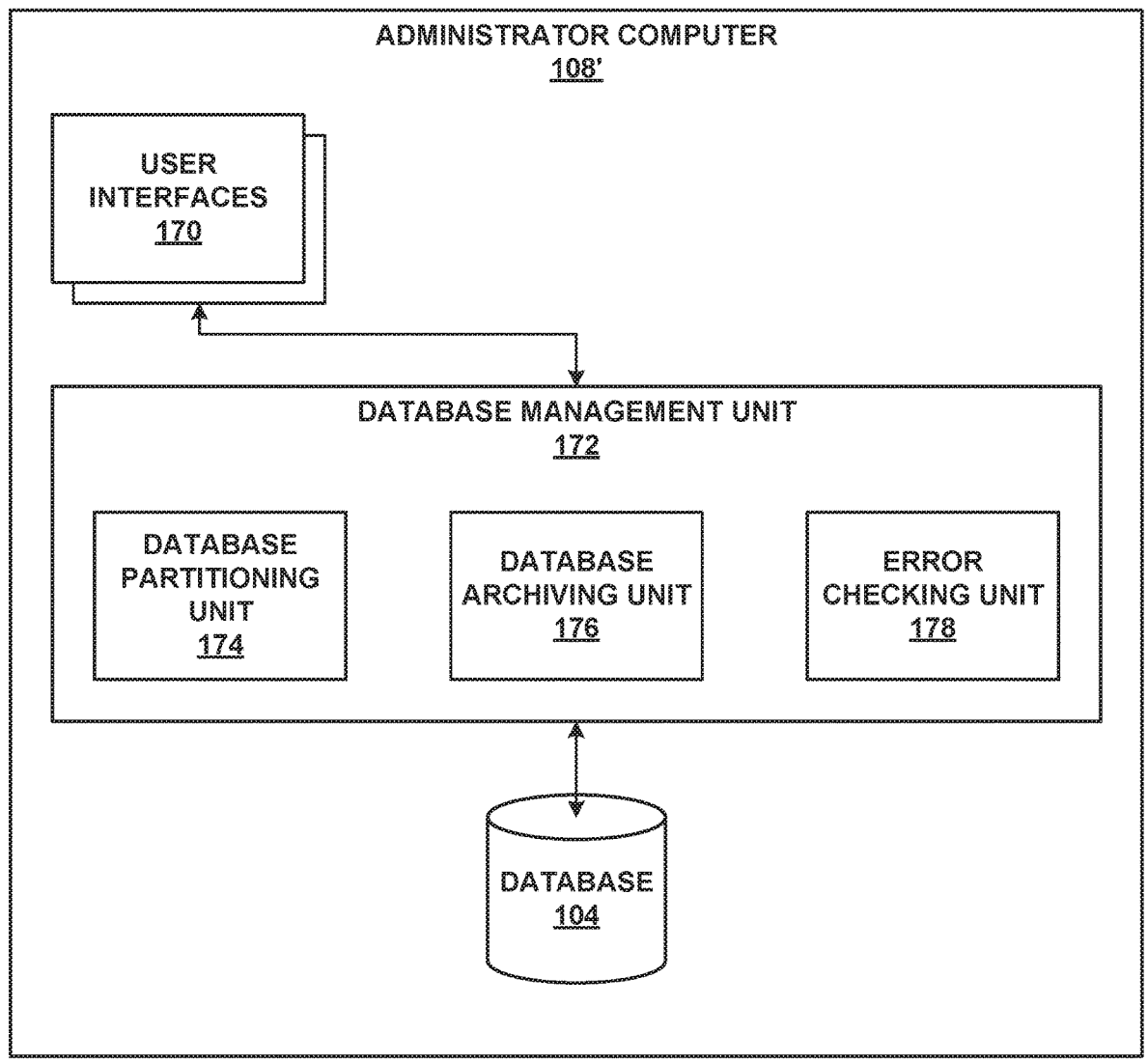
FIG. 6 is a block diagram illustrating another example administrator computer that includes a database internally.

FIG. 6 is a block diagram illustrating another example administrator computer 108'. Administrator computer 108' is substantially similar to administrator computer 108 of FIG. 5, except that in the example of FIG. 6, administrator computer 108' includes database 104 internally. Administrator computer 108' may alternatively be referred to as a database system or database server. In this example, user computers 102 may interact with database 104 via administrator computer 108'. Although not shown for brevity, administrator computer 108' may further include a network interface or other interface to communicatively couple administrator computer 108' to user computers 102. Administrator computer 108' of FIG. 6 may be configured to perform any or all of the techniques of this disclosure as discussed above, such as the method of FIG. 4.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, includes random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other such media. It should be understood that the term "computer-readable storage media" refers to physical storage media, and not signals, carrier waves, or other transient media.

Various examples have been described. These and other examples are within the scope of the following claims.

What is claimed is:

1. A method of partitioning a database, the method comprising:
   receiving, by a hardware-based processor, data representing configuration information for the database from a user, the configuration information defining a partitioning structure for one or more tables of the database and one or more filegroups for the database;
   creating, by the hardware-based processor, a maintenance table within the database, wherein the maintenance table is configured to store data describing the received partitioning structure;
   creating, by the hardware-based processor, a maintenance filegroup including data that describes the one or more filegroups for the database that are available for use when partitioning the database;
   forming, by the hardware-based processor, a partition function based on the partitioning structure stored in the maintenance table, the maintenance filegroup, and a schema for the database, wherein forming the partition function comprises querying, by the hardware-based processor, the maintenance table to determine how to form the partition function to partition the one or more tables and mapping partitions to the filegroups according to the maintenance filegroup, and wherein the configuration information does not include the partition function; and
   applying by the hardware-based processor, the partition function to the one or more tables to partition the one or more tables.

2. The method of claim 1, wherein forming the partition function comprises determining the one or more tables to which to apply the partition function from the configuration information.

3. The method of claim 1, wherein forming the partition function comprises forming the partition function to partition the one or more tables by a level of a date hierarchy, wherein the level of the date hierarchy comprises one of daily, weekly, monthly, quarterly, or yearly.

4. The method of claim 1, wherein applying the partition function to the one or more tables comprises forming a plurality of partitions of the one or more tables, the method further comprising:
   maintaining a first subset of the plurality of partitions as active partitions; and
   archiving a second subset of the plurality of partitions as archived partitions.

5. The method of claim 4, further comprising deleting a third subset of the plurality of partitions, wherein the third subset of the plurality of partitions includes all partitions of the plurality of partitions that are not included in the first subset or the second subset.

6. The method of claim 4, wherein maintaining the first subset of the plurality of partitions comprises:
   determining a value representative of a number of partitions to be included in a sliding window of active partitions; and
   when the number of partitions in the first subset of the plurality of partitions exceeds the number of partitions to be included in the sliding window, deleting partitions from the first subset until the number of partitions in the first subset is equal to the number of partitions to be included in the sliding window.

7. The method of claim 1, wherein the one or more tables comprise one or more partitioned tables, the method further comprising:
   determining a first set of data of an unpartitioned table that is to be deleted from the unpartitioned table; and
   deleting one or more rows of the unpartitioned table corresponding to the first set of data.

8. The method of claim 1, further comprising, after partitioning the one or more tables:
   determining that a first table of the one or more tables is to be partitioned according to a different partition function;
   forming a hold table including data from partitions of the first table; and
   partitioning the first table according to the different partition function only when the first table is identical to the hold table.

9. The method of claim 1, wherein the one or more tables comprise a plurality of tables, the method further comprising, prior to partitioning the one or more tables:
   determining whether the plurality of tables have common archiving behaviors; and
   applying the partition function to the plurality of tables only when the plurality of tables have the common archiving behaviors.

10. The method of claim 1, further comprising:
    prior to partitioning the one or more tables, determining whether the partition function can be applied to the one or more tables; and
    after partitioning the one or more tables, determining whether the partition function correctly partitioned the one or more tables.

11. A device for partitioning a database, the device comprising:
    an interface to a database comprising one or more tables; and
    a hardware-based processor configured to:
      receive data representing configuration information for the database from a user, the configuration information defining a partitioning scheme for the one or more tables of the database and one or more filegroups for the database;
      create a maintenance table within the database, wherein the maintenance table is configured to store data describing the received partitioning structure;
      create a maintenance filegroup including data that describes the one or more filegroups for the database that are available for use when partitioning the database;
      form a partition function based on the partitioning structure stored in the maintenance table, the maintenance filegroup, and a schema for the database, wherein to form the partition function, the hardware-based processor is configured to query the maintenance table to determine how to form the partition function to partition the one or more tables and map partitions to the filegroups according to the maintenance filegroup, and wherein the configuration information does not include the partition function; and
      apply the partition function to the one or more tables to partition the one or more tables.

12. The device of claim 11, wherein the hardware-based processor is configured to form the partition function to partition the one or more tables by a level of a date hierarchy, wherein the level of the date hierarchy comprises one of daily, weekly, monthly, quarterly, or yearly.

13. The device of claim 11, wherein the hardware-based processor is configured to form a plurality of partitions of the tables through application of the partition function to the one or more tables, and wherein the hardware-based processor is further configured to:
- maintain a first subset of the plurality of partitions as active partitions; and
- archive a second subset of the plurality of partitions as archived partitions.

14. The device of claim 13, wherein the hardware-based processor is further configured to delete a third subset of the plurality of partitions, wherein the third subset of the plurality of partitions includes all partitions of the plurality of partitions that are not included in the first subset or the second subset.

15. The device of claim 11, wherein the hardware-based processor is further configured to:
- prior to performing partition maintenance on the one or more tables, determine whether the partition function can be applied to the one or more tables; and
- after performing partition maintenance on the one or more tables, determine whether the one or more tables are correctly partitioned according to the partition function.

16. A non-transitory computer-readable storage medium having stored thereon instructions that, when executed, cause a processor to:
- receive data representing configuration information for the database from a user, the configuration information defining a partitioning scheme for the one or more tables of the database and one or more filegroups for the database;
- create a maintenance table within the database, wherein the maintenance table is configured to store data describing the received partitioning structure;
- create a maintenance filegroup including data that describes the one or more filegroups for the database that are available for use when partitioning the database;
- form a partition function based on the partitioning structure stored in the maintenance table, the maintenance filegroup, and a schema for the database, wherein to form the partition function, the instructions cause the processor to query the maintenance table to determine how to form the partition function to partition the one or more tables and map partitions to the filegroups according to the maintenance filegroup, and wherein the configuration information does not include the partition function; and
- apply the partition function to the one or more tables to partition the one or more tables.

17. The non-transitory computer-readable storage medium of claim 16, further comprising instructions that cause the processor to form the partition function to partition the one or more tables by a level of a date hierarchy, wherein the level of the date hierarchy comprises one of daily, weekly, monthly, quarterly, or yearly.

18. The non-transitory computer-readable storage medium of claim 16, wherein the instructions that cause the processor to apply the partition function comprise instructions that cause the processor to form a plurality of partitions of the tables, further comprising instructions that cause the processor to:
- maintain a first subset of the plurality of partitions as active partitions; and
- archive a second subset of the plurality of partitions as archived partitions.

19. The non-transitory computer-readable storage medium of claim 18, further comprising instructions that cause the processor to delete a third subset of the plurality of partitions, wherein the third subset of the plurality of partitions includes all partitions of the plurality of partitions that are not included in the first subset or the second subset.

20. The non-transitory computer-readable storage medium of claim 16, further comprising instructions that cause the processor to:
- prior to partitioning the one or more tables, determine whether the partition function can be applied to the one or more tables; and after partitioning the one or more tables, determine whether the partition function correctly partitioned the one or more tables.

* * * * *